(12) United States Patent  
Burlatsky et al.

(10) Patent No.: US 9,023,551 B2  
(45) Date of Patent: May 5, 2015

(54) PROTECTIVE AND PRECIPITATION LAYERS FOR PEM FUEL CELL

(75) Inventors: Sergei F. Burlatsky, West Hartford, CT (US); Ned E. Cipollini, Enfield, CT (US); David A. Condit, Avon, CT (US); Thomas H. Madden, Glastonbury, CT (US); Sathya Motupally, Milford, CT (US); Lesia V. Protsailo, East Hartford, CT (US); Timothy W. Patterson, East Hartford, CT (US); Lei Chen, South Windsor, CT (US); Mallika Gummalla, Longmeadow, MA (US)

(73) Assignee: Ballard Power Systems Inc., Burnaby (CA)

( * ) Notice: Subject to any disclaimer, the term of this patent is extended or adjusted under 35 U.S.C. 154(b) by 1071 days.

(21) Appl. No.: 12/863,159

(22) PCT Filed: Jan. 3, 2008

(86) PCT No.: PCT/US2008/050075  
§ 371 (c)(1),  
(2), (4) Date: Jul. 15, 2010

(87) PCT Pub. No.: WO2009/085327  
PCT Pub. Date: Jul. 9, 2009

(65) Prior Publication Data  
US 2011/0020727 A1 Jan. 27, 2011

(51) Int. Cl.  
*H01M 4/36* (2006.01)  
*H01M 4/92* (2006.01)  
*H01M 8/10* (2006.01)

(52) U.S. Cl.  
CPC ............... *H01M 4/92* (2013.01); *H01M 4/921* (2013.01); *H01M 4/926* (2013.01); *H01M 8/1004* (2013.01); *Y02E 60/521* (2013.01)

(58) Field of Classification Search  
USPC .................................. 429/483, 465, 492, 505  
See application file for complete search history.

(56) References Cited

U.S. PATENT DOCUMENTS

| 5,783,325 | A | 7/1998 | Cabasso et al. |
| 5,795,668 | A | 8/1998 | Banerjee |

(Continued)

FOREIGN PATENT DOCUMENTS

| JP | 2000107773 A | 4/2000 |
| WO | 2004/023576 A2 | 3/2004 |

(Continued)

OTHER PUBLICATIONS

Fuel-Cell Technology and Its Applications, First Edition, p. 97, TechnoSystem, 2000.

(Continued)

*Primary Examiner* — Patrick Ryan  
*Assistant Examiner* — Alex Usyatinsky  
(74) *Attorney, Agent, or Firm* — Seed IP Law Group PLLC

(57) ABSTRACT

A membrane electrode assembly is provided which includes an anode; a cathode; a membrane between the anode and the cathode; and a protective layer between the membrane and at least one electrode of the anode and the cathode, the protective layer having a layer of ionomer material containing a catalyst, the layer having a porosity of between 0 and 10%, an ionomer content of between 50 and 80% vol., a catalyst content of between 10 and 50% vol., and an electrical connectivity between catalyst particles of between 35 and 75%. A configuration using a precipitation layer to prevent migration of catalyst ions is also provided.

63 Claims, 9 Drawing Sheets

(56) References Cited

U.S. PATENT DOCUMENTS

| | | |
|---|---|---|
| 6,020,083 A | 2/2000 | Breault et al. |
| 6,024,848 A | 2/2000 | Dufner et al. |
| 6,335,112 B1 | 1/2002 | Asukabe et al. |
| 6,391,487 B1 | 5/2002 | Totsuka |
| 6,485,856 B1 | 11/2002 | Brown et al. |
| 6,613,203 B1 | 9/2003 | Hobson et al. |
| 6,638,659 B1 | 10/2003 | Fenton et al. |
| 7,112,386 B2 | 9/2006 | Cipollini et al. |
| 2002/0031696 A1 | 3/2002 | Kawahara et al. |
| 2003/0008196 A1 | 1/2003 | Wessel et al. |
| 2004/0224216 A1 | 11/2004 | Burlatsky et al. |
| 2005/0064256 A1 | 3/2005 | Morse et al. |
| 2005/0196661 A1 | 9/2005 | Burlatsky et al. |
| 2007/0072036 A1 | 3/2007 | Berta et al. |
| 2007/0264189 A1 | 11/2007 | Adzic et al. |

FOREIGN PATENT DOCUMENTS

| | | |
|---|---|---|
| WO | 2007/050084 A1 | 5/2007 |
| WO | 2007/050460 A2 | 5/2007 |
| WO | WO 2007/050084 * | 5/2007 |
| WO | WO 2007/050460 * | 5/2007 |
| WO | 2007/119132 A1 | 10/2007 |
| WO | WO 2007119132 A1 * | 10/2007 |

OTHER PUBLICATIONS

Visual Guide—All About Fuel Cells, First Edition, p. 101, Kogyo Chosakai Publishing Co., LTD., 2003.

Japanese Office Action for Application No. 2007-549333 dated Sep. 13, 2011.

Korean Office Action for Application No. 10-2005-7003682 dated Oct. 28, 2010.

* cited by examiner

PROTECTIVE AND PRECIPITATION LAYERS FOR PEM FUEL CELL

BACKGROUND OF THE DISCLOSURE

The disclosure relates to fuel cells and, more particularly, to PEM fuel cells and reduction in degradation of ionomer, for example in the membrane and electrodes of same.

In a PEM fuel cell, a small amount of oxygen diffuses from the cathode to the anode through the membrane and can form peroxide by reacting with hydrogen ions at low potential at the anode catalyst membrane interface. In addition, oxygen added to the fuel for carbon monoxide tolerance can form peroxide in the anode. This peroxide can dissociate into highly reactive free radicals. Free radicals may also form directly from crossover gases at catalyst surfaces within the membrane or at the electrodes. These free radicals can rapidly degrade the ionomer in the membrane and electrodes.

It is desired to achieve 40,000-70,000 hour and 5,000-10,000 hour lifetimes for stationary and transportation PEM fuel cells, respectively. Free radical degradation of the ionomer seriously interferes with efforts to reach these goals.

While numerous sources of oxygen, hydrogen and/or peroxide can contribute to this problem, hydrogen crossing over from the anode, oxygen crossing over from the cathode, oxygen in the fuel stream, and hydrogen peroxide and/or free radicals generated by the same are all issues to be addressed.

It is one object of the present disclosure to minimize degradation caused by such sources of reactive free radicals.

It is a further object of the disclosure to minimize precipitation of catalyst ions in the membrane. Such catalyst may form the sites for radical generation within the membrane.

It is a further object to provide a membrane electrode assembly having an extended lifetime due to such reduction of crossover gases, enhanced peroxide and/or radical decomposition, and reduced degradation from peroxide and/or free radicals generated.

Other objects and advantages will appear herein below.

SUMMARY OF THE DISCLOSURE

According to the disclosure, the foregoing have been readily achieved.

A membrane electrode assembly is provided which comprises an anode; a cathode; a membrane between the anode and the cathode; and a protective layer between the membrane and at least one electrode of the anode and the cathode, the protective layer comprising a layer of ionomer material containing a catalyst, the layer having a porosity of between 0 and 10%, an ionomer content of between 50 and 80% vol., a catalyst content of between 10 and 50% vol., and an electrical connectivity between catalyst particles of between 35 and 75%.

A membrane electrode assembly is also provided which comprises an anode having a catalyst; a cathode; a membrane between the anode and the cathode; and a precipitation layer between the membrane and at least one electrode of the anode and the cathode.

BRIEF DESCRIPTION OF THE DRAWINGS

A detailed description of preferred embodiments follows, with reference to the attached drawings, wherein.

DETAILED DESCRIPTION

The disclosure relates to fuel cells, especially to polymer electrolyte membrane (PEM) fuel cells, and more specifically to reduction of oxygen and hydrogen crossover from the cathode and anode, respectively, through positioning of a protective layer between the membrane and either or both of the anode and cathode which consumes these gases before penetrating the membrane and thereby avoids production of hydrogen peroxide and/or free radicals.

The disclosure also relates to a precipitation layer for converting ionic catalyst metals to metallic form to prevent migration of such ions into the membrane.

According to the invention, a protective layer is positioned between the membrane and at least one of the anode or cathode of the membrane electrode assembly. The protective layer advantageously serves to prevent crossover of oxygen and/or hydrogen, reduce the chance for formation of peroxide and/or free radicals, and/or provide for benign decomposition of peroxide and/or free radicals, all of which serves to increase the useful lifetime of the membrane electrode assembly by preventing peroxide generated radicals from attacking the ionomer of the membrane and electrodes.

Membrane electrode assemblies such as that which are the subject of the present invention are disclosed in co-pending and commonly owned U.S. patent application Ser. No. 10/235,074, filed Sep. 4, 2002, now U.S. Pat. No. 7,112,386 (B2), which is incorporated herein by reference.

It has been found that a protective layer can be positioned between the membrane and either or both of the electrodes so as to reduce crossover of the oxygen and/or hydrogen and also to decompose any peroxide which is formed, thereby preventing attack on the ionomer of the membrane and electrodes. This attack on the ionomer material is referred to hereafter as attack on the membrane, and should be understood as meaning attack on the membrane material, or ionomer, and also on this ionomer as is present in the electrodes. The protective layer can be a layer of catalyst particles dispersed through or embedded in ion-exchange polymer material as will be further discussed below.

Figure 1:
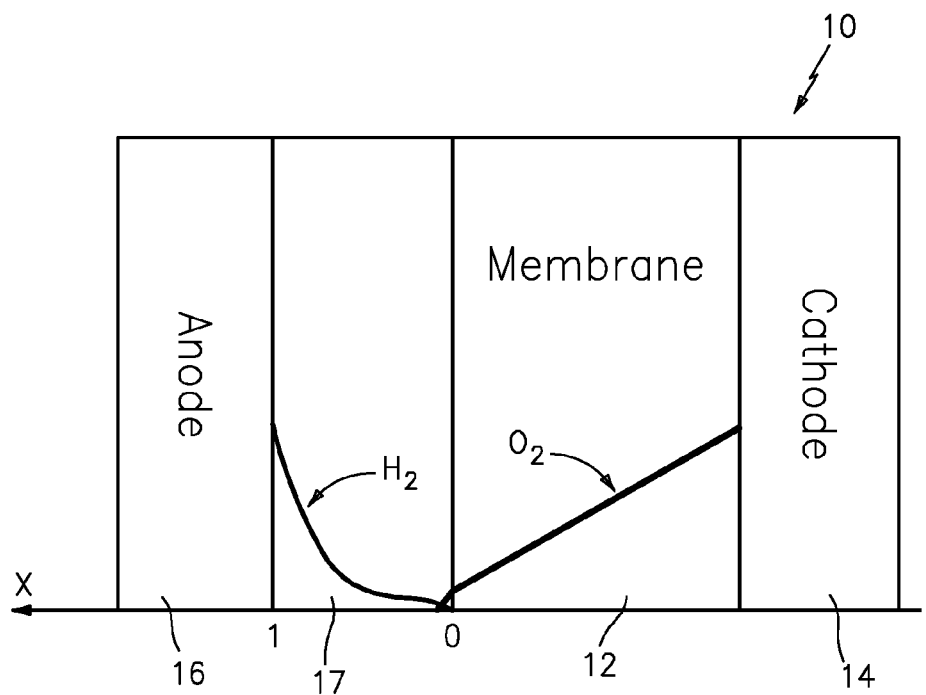
FIG. 1 illustrates a membrane electrode assembly having a protective layer between the anode and the membrane.

Turning to FIG. 1, a membrane electrode assembly 10 is illustrated in accordance with the present disclosure and includes a membrane 12, a cathode 14 and an anode 16. Membrane 12 is positioned between cathode 14 and anode 16 and serves to provide function of a fuel cell electrolyte and separate oxygen from hydrogen as is well known to persons of ordinary skill in the art. In the course of such operation, hydrogen diffuses through anode 16 into and through membrane 12, and oxygen diffuses through cathode 14 and into and through membrane 12 and these components can form peroxide, predominantly at the anode. Free radicals may also form directly from crossover gases at catalyst surfaces within the membrane or at the electrodes. The hydrogen and oxygen flux, expressed in terms of current density, are substantially the same as crossover current, which is typically 2-4 $mA/cm^2$ depending upon membrane thickness.

Still referring to FIG. 1, in this embodiment a protective layer is provided in the form of layer 17 positioned between membrane 12 and anode 16. Layer 17 is a layer of particulate catalyst material which is embedded in a matrix which contains ion-exchange or ion-conducting material.

Suitable catalyst particles for protective layers include particles of Pt, Pd, Ir, C, Ag, Au, Rh, Ru, Sn, Si, Ti, Zr, Al, Hf, Ta, Nb, Ce, Ni, Co and combinations thereof including oxides where applicable, more preferably Pt, Pd, Ir, C, Ag, Au, Rh, Ru, Ti and combinations thereof, including oxides where applicable. The combinations include core shell structures, for example wherein there is a Co core and platinum monolayers on top. These combinations can include binary and ternary alloys of the catalyst materials choosen.

Such catalysts are further preferably provided on a support which may advantageously be selected from the group consisting of oxides of Ru, Sn, Si, Ti, Zr, Al, Hf, Ta, Nb and Ce, as well as zeolites, carbon and mixtures thereof. Particles of platinum, platinum supported on carbon, carbon itself, platinum alloys such as platinum-cobalt alloys, platinum-nickel alloys and the like, are particularly preferred. In addition to alloys, various phase segregated metals and metals on supports can also be used within the broad scope of the present invention. The catalyst is selected to have activity toward hydrogen oxidation and oxygen reduction reactions which can be used to protect membrane 12 from peroxide and/or radical attack. Such catalyst can also typically be the same catalyst positioned in the respective electrode which the protective layer is adjacent to. In some situations, it may be desirable to select or modify the above catalyst particles in a way that renders the extended catalyzed layers hydrophilic.

It has been found beneficial to have catalyst particles in layer 17 including a first portion which are electrically connected to the anode and a second portion which are not electrically connected to the anode. The first portion of particles are at nearly the same potential as anode 16 due to electrical connection therewith. These electrically connected particles are well suited to breaking down hydrogen crossing from anode 16 into layer 17, and thereby preventing this hydrogen from reaching the membrane and/or oxygen diffusing through the membrane. The second portion of particles which are not electrically connected to anode 16 have a potential which increases with decreasing $H_2$ concentration and with increasing $O_2$ concentration in layer 17. Therefore, the potential is lower near the interface between anode 16 and layer 17 than it is near the interface between layer 17 and membrane 12. Catalyst particles at the proper potential are active toward benign decomposition of peroxide and/or free radicals. Providing electrically disconnected particles in layer 17 provides for catalyst particles at the appropriate potential and location to facilitate benign decomposition of peroxide and/or free radicals, thereby extending lifetime of membrane 12.

Figure 1A:
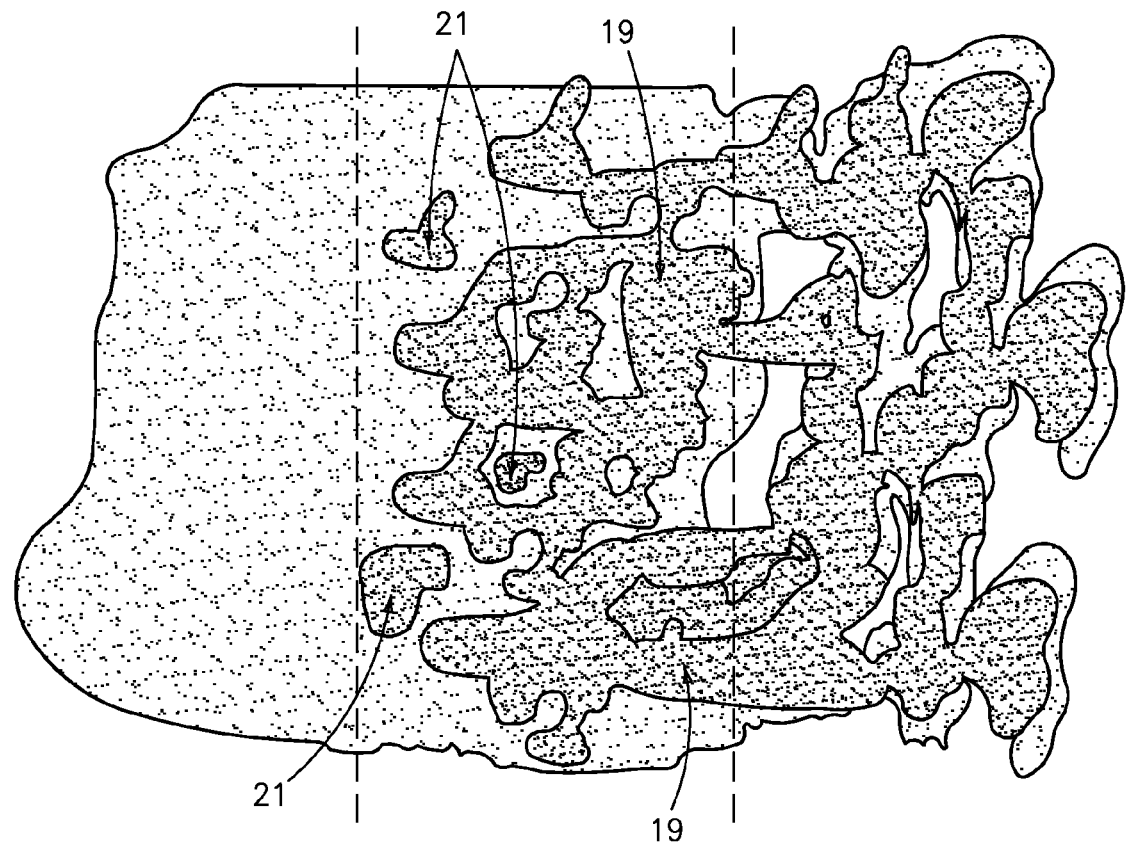

FIG. 1a shows a portion of a protective layer 17 including a plurality of connected particles 19 and disconnected particles 21. As used herein, particles are considered electrically connected to an electrode if they are directly or indirectly in contact with same. This can occur through many interconnected particles. As used herein, particles are considered disconnected if they are not directly or indirectly in contact with the electrode. It is entirely possible or probable that disconnected particles 21 can be in contact with each other, for example in aggregates or clumps, but these clumps are not themselves connected to the electrode.

When the fuel cell including assembly 10 is on-load, the connected particles of layer 17 by virtue of electrical connection are at the same potential as anode 16. The hydrogen oxidation reaction therefore occurs at a rate as provided for by the diffusion rate into layer 17. Porosity of layer 17 is reduced by at least a factor of 10 as compared to a typical fuel cell electrode (~50% to <5%) during fabrication by filling with ion-exchange polymer. Remaining porosity of layer 17 is flooded by water which back-diffuses from cathode 14 while on-load. This results in any existing porosity in the protective layer 17 being substantially filled with liquid to present a solid-liquid phase. Thus, a low flux of hydrogen diffuses through the solid-liquid phase represented by layer 17. This results in efficient consumption of hydrogen thus producing a decay profile as shown in FIG. 1.

A decay profile is experienced for oxygen diffusing through membrane 12 from the cathode-membrane interface to the anode-membrane interface. At the anode-side protective layer-membrane interface, crossover oxygen encounters a near-zero potential with protective layer catalyst that is electrically connected to anode 16, and likewise is either quantitatively reduced to water or partially to water and peroxide, depending on the catalyst structure, concentration, thickness of layer 17 and thickness of membrane 12. However, since the low potential required for both reduction reactions occurs to a larger extent close to the anode/protective layer interface than at the protective layer/membrane interface, crossover oxygen must diffuse well into layer 17 before it can partially reduce to form peroxide with high selectivity.

Further, should any peroxide/free radicals be formed at this location, that is, the interface between anode 16 and layer 17, the disconnected catalyst particles of layer 17 will advantageously decompose such peroxide to water and oxygen before it can reach membrane 12, especially since the potential of disconnected catalyst particles in layer 17 is highest (i.e. most suitable for benign composition of peroxide) near the interface between layer 17 and membrane 12.

Figure 2:
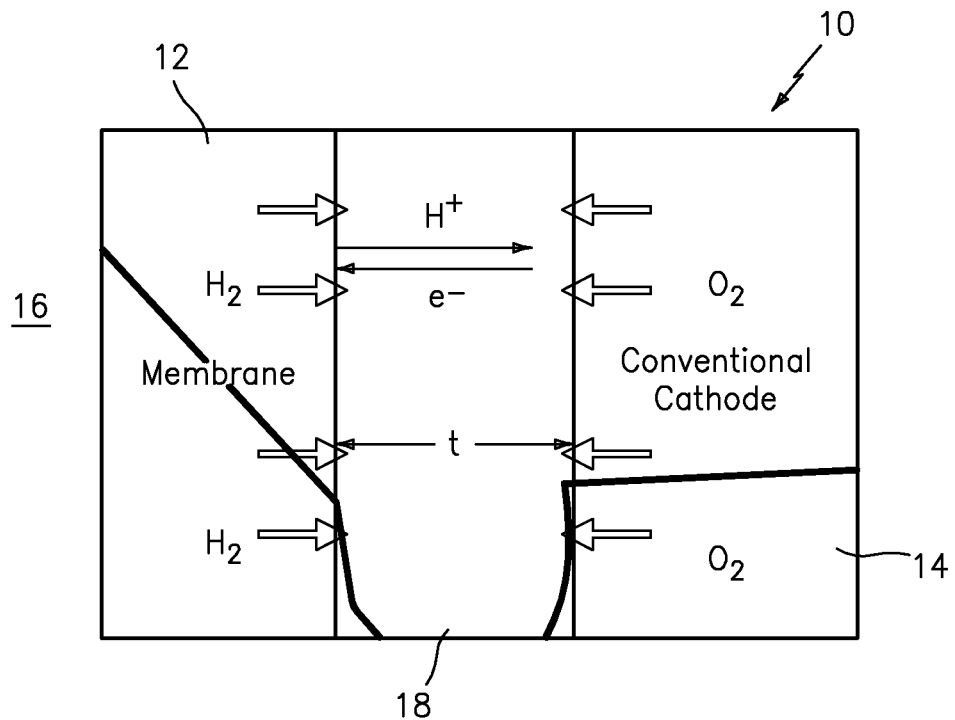
FIG. 2 illustrates a membrane electrode assembly having a protective layer between the cathode and the membrane.

FIG. 2 illustrates another embodiment wherein a protective layer 18 is positioned between membrane 12 and cathode 14. Layer 18 advantageously serves to consume oxygen as it diffuses from cathode 14 toward membrane 12, thereby avoiding the possibility of formation of peroxide within the anode and/or anode-side protective layer, or free radicals directly at the cathode or at catalyst sites within the membrane.

FIG. 2 shows oxygen concentration 15 from cathode 14 to layer 18, and also shows hydrogen concentration 13 in membrane 12 and layer 18. A central portion 19 of layer 18 is defined where peroxide and/or free radicals are decomposed and/or not generated.

Layer 18 can be provided in several forms. In accordance with a preferred embodiment, layer 18 comprises a portion of catalyst, for example carbon supported platinum particles, the gas pores of which are filled with ion-exchange polymer. Other suitable catalyst includes carbon itself, as well as platinum alloys, preferably platinum-cobalt alloy and platinum-nickel alloy, which may be supported on carbon. Other suitable materials are as set forth above.

At the relatively high potential which is present in the cathode-side protective layer, the four electron reduction of oxygen is predominately achieved so as to produce water and not to produce peroxide.

The cathode-side protective layer 18 serves to consume such oxygen at high potential, most actively at the interface 20 between layer 18 and cathode 14. Layer 18 further serves to consume hydrogen at the interface 22 between membrane 12 and layer 18. Further, layer 18 also provides for benign decomposition of peroxide and/or radicals at interface 20 and throughout the thickness of layer 18 if peroxide and/or radicals are generated in cathode 14 and at interface 22 and throughout the thickness of layer 18 if peroxide is generated in anode 16. These functions advantageously serve to reduce a significant contributor toward cell degradation.

Layer 18 can advantageously be substantially electrically connected to cathode 14 through an electrically conducting phase, for example such as carbon support material, so as to ensure high potential and, therefore, consumption of crossover oxygen to produce water.

Layer 18 further preferably has substantially no porosity and a relatively high inherent oxygen reduction rate. This will result in a maximized ratio of oxygen reduction rate to oxygen diffusion rate, and thereby will minimize oxygen escape from the extended cathode and crossover rate to the anode.

In this regard, layer 18 advantageously has a porosity of less than about 30%, and is preferably substantially non-porous. Oxygen reduction activity per unit platinum surface area for layer 18 is also advantageously approximately the same as the cathode because of electrical connectivity to the cathode.

Any porosity of layer 18 may advantageously be flooded during operation, for example with water, so as to reduce the oxygen diffusion rate therethrough. To this end, the pores of layer 18 can be treated or otherwise provided with an affinity toward the flooding liquids, for example water.

Provision of a layer 18 having these properties advantageously results in efficient oxygen consumption at interface 20 and throughout layer 18 and, therefore, extended membrane life as compared to other types of membrane electrode assemblies.

Figure 3:
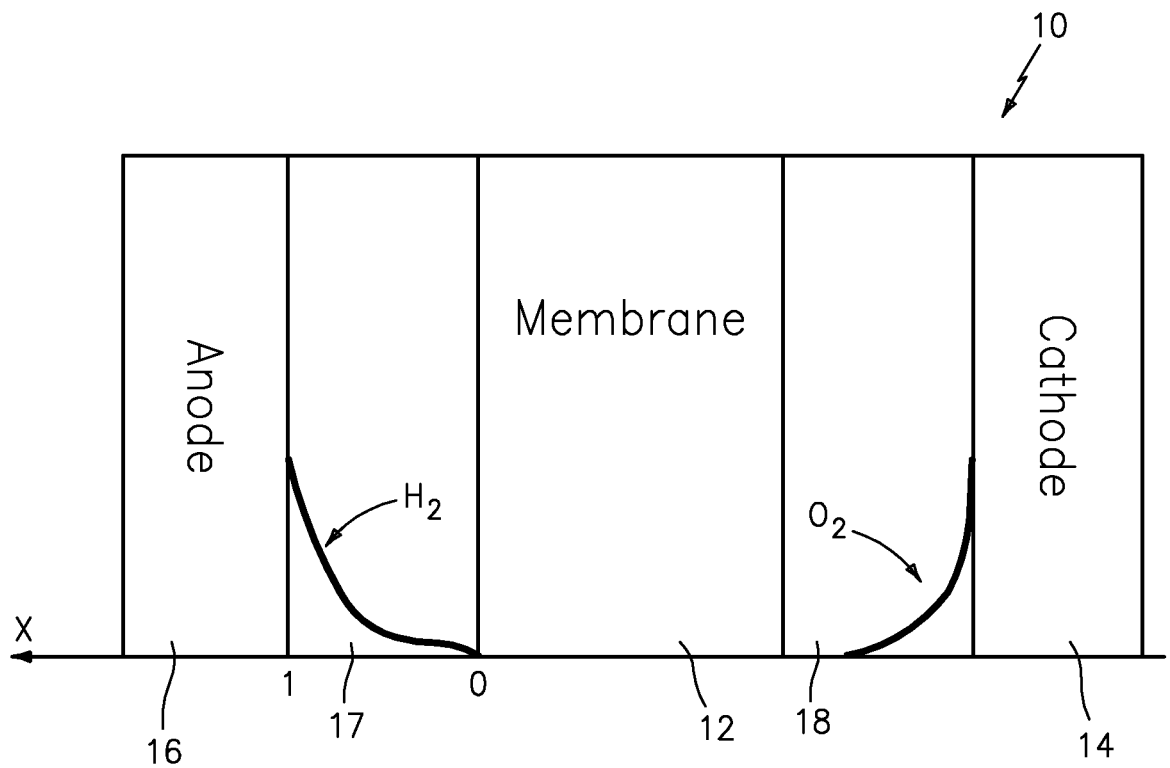
FIG. 3 illustrates a membrane electrode assembly having a protective layer between the anode and the membrane and between the cathode and the membrane.

FIG. 3 illustrates a further embodiment which includes two protective layers, namely an anode-side protective layer 17 and a cathode-side protective layer 18. As will be discussed below, this embodiment provides excellent protection from peroxide mediated decomposition of the membrane, and is well suited to a cell that may be operated using reformate fuel, as one non-limiting example.

FIG. 3 shows an assembly 10 including membrane 12, cathode 14 and anode 16, as well as layer 17 positioned between anode 16 and membrane 12 and layer 18 positioned between cathode 14 and membrane 16. In this configuration, it is preferred to provide a proportion of disconnected catalyst particles in layer 17 which is greater than the proportion of disconnected particles in layer 18. This advantageously serves to minimize the flux of any peroxide which may be generated at the anode side back toward membrane 12.

Further, and as demonstrated below, this configuration maximizes protection for membrane 12 by greatly reducing crossover of both hydrogen and oxygen, and by benignly decomposing any peroxide and/or radicals which are formed at anode 16 within layer 17 and/or formed at the cathode 14 within layer 18.

It should be noted that the subject matter of the present invention can advantageously be utilized in connection with various membranes including but not limited to reinforced membranes. The reinforced membranes can include membranes having mechanical reinforcements, examples of which include but are not limited those disclosed in U.S. Pat. Nos. 5,795,668, 6,485,856 and 6,613,203.

Protective layers such as anode-side layer 17 and cathode-side layer 18 can advantageously be provided as a porous, partially electrically connected and ionically conductive structure having a porosity of between about 0% and about 30%. The catalyst particles can be present in an amount between about 5 and about 50% vol based upon volume of the layer. Ionomer is also present in an amount between about 5 and about 95% vol. based upon volume of the layer. The protective layer can be provided having particles selected from various materials, preferably selected from the group consisting of particles of carbon, particles of platinum and platinum alloy, and combinations thereof.

Fluoride-emission rates from a fuel cell are indicative of membrane degeneration, including degradation due to exposure to free radicals generated from peroxide or directly on suitable catalysts. Measurements of reduced fluoride emission can demonstrate protection of the membrane from degeneration.

In order to demonstrate effectiveness, F-emission rates were measured from fuel cells incorporating protective layers as compared to baseline fuel cells with no protective layer(s). Fluoride emission rates are indicative of chemical attack rates of the polymer, and are measured by fluoride analysis of condensed reactant gases at the effluent of the fuel cell.

Figure 4:
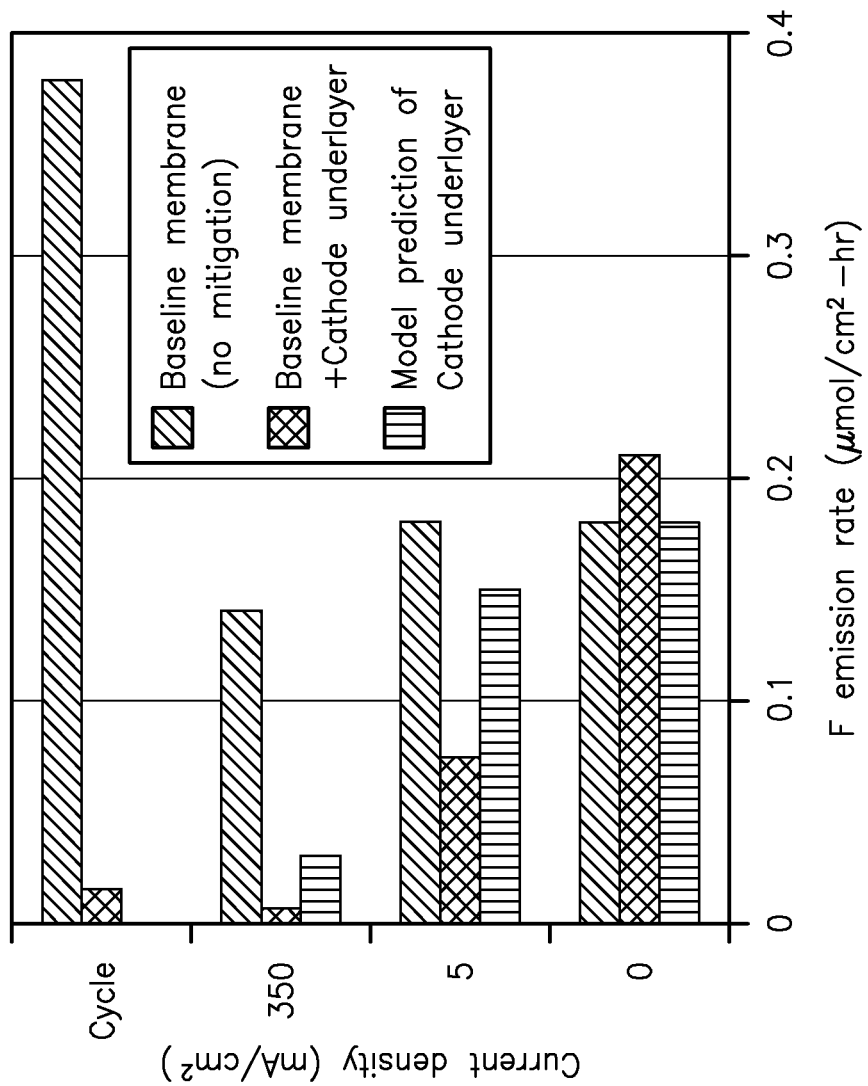
FIG. 4 illustrates fluoride emission rates for a baseline membrane, as well as prediction model and actual test results for a membrane electrode assembly having a cathode side protective layer.

FIG. 4 shows fluoride emission data for a baseline membrane with no protective layer and for a membrane having a cathode-side protective layer as in the embodiment of FIG. 2. FIG. 4 shows that, at increasing current densities, the cathode-side layer provided a dramatic reduction in fluoride emissions, this indicating successful protection of the fluorine-containing membrane from attack during operation. The data shown was obtained using a predictive model and also from actual testing. This data clearly shows that at higher current densities, for example above 5 mA/cm$^2$, and especially at 350 mA/cm$^2$ and higher, the cathode-side layer is providing substantial protection to the membrane. Also shown in FIG. 4, the cathode-side layer provides protection from degradation of the membrane in the "cycle" condition, which represents transient operation of a fuel cell that is known to accelerate degeneration of the membrane.

Figure 5:
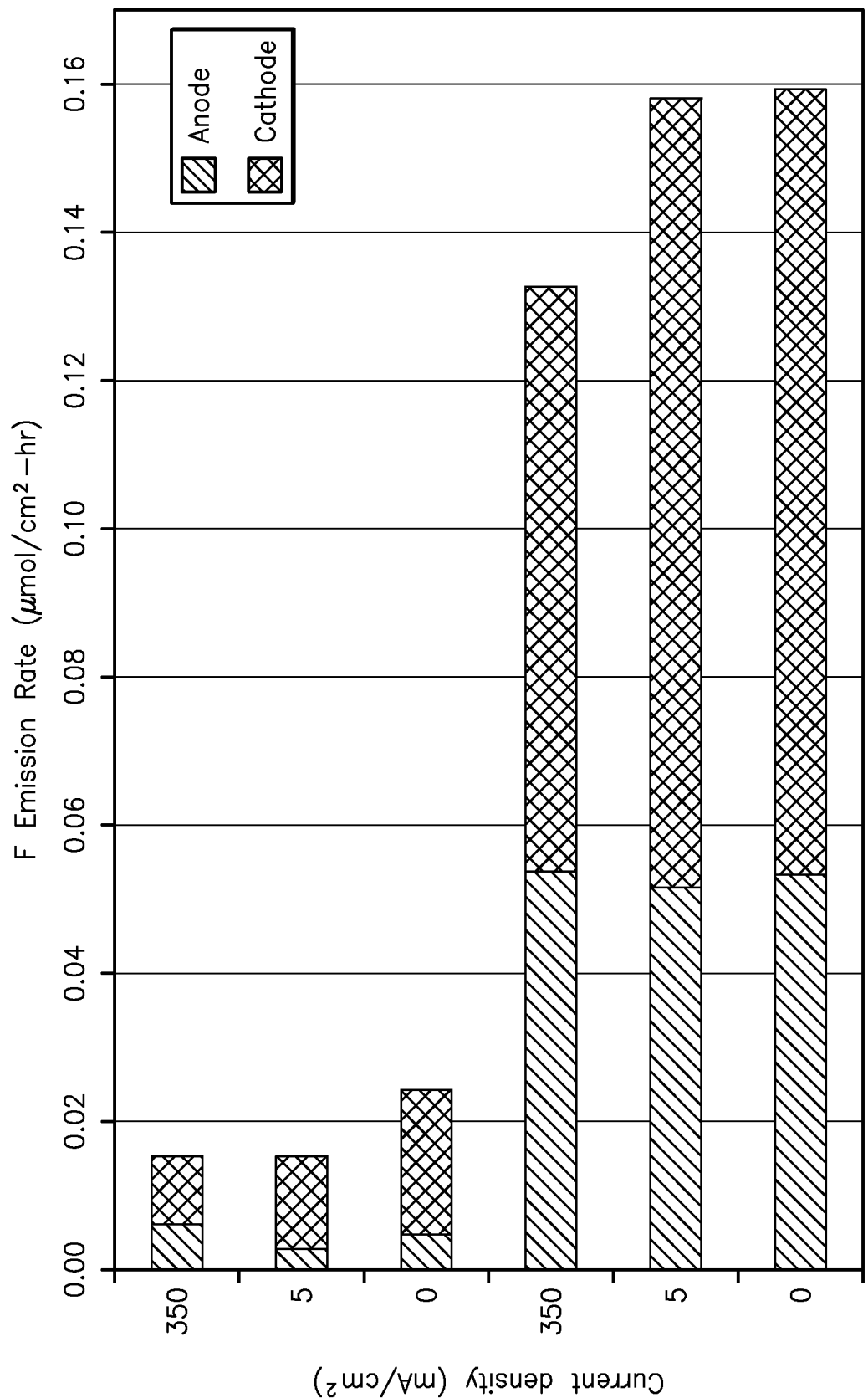
FIG. 5 illustrates fluoride emission rates for a baseline membrane and a membrane electrode assembly having an anode side protective layer.

FIG. 5 shows results obtained from testing the baseline fuel cell and also from testing a fuel cell with an anode-side protective layer (i.e. the embodiment described by FIG. 1). This data shows that fluoride emissions are dramatically reduced for any current density. This data was gathered under "wet decay" conditions, including a temperature of 90° C., a relative humidity of 100%, and a flow of hydrogen and oxygen.

Figure 6:
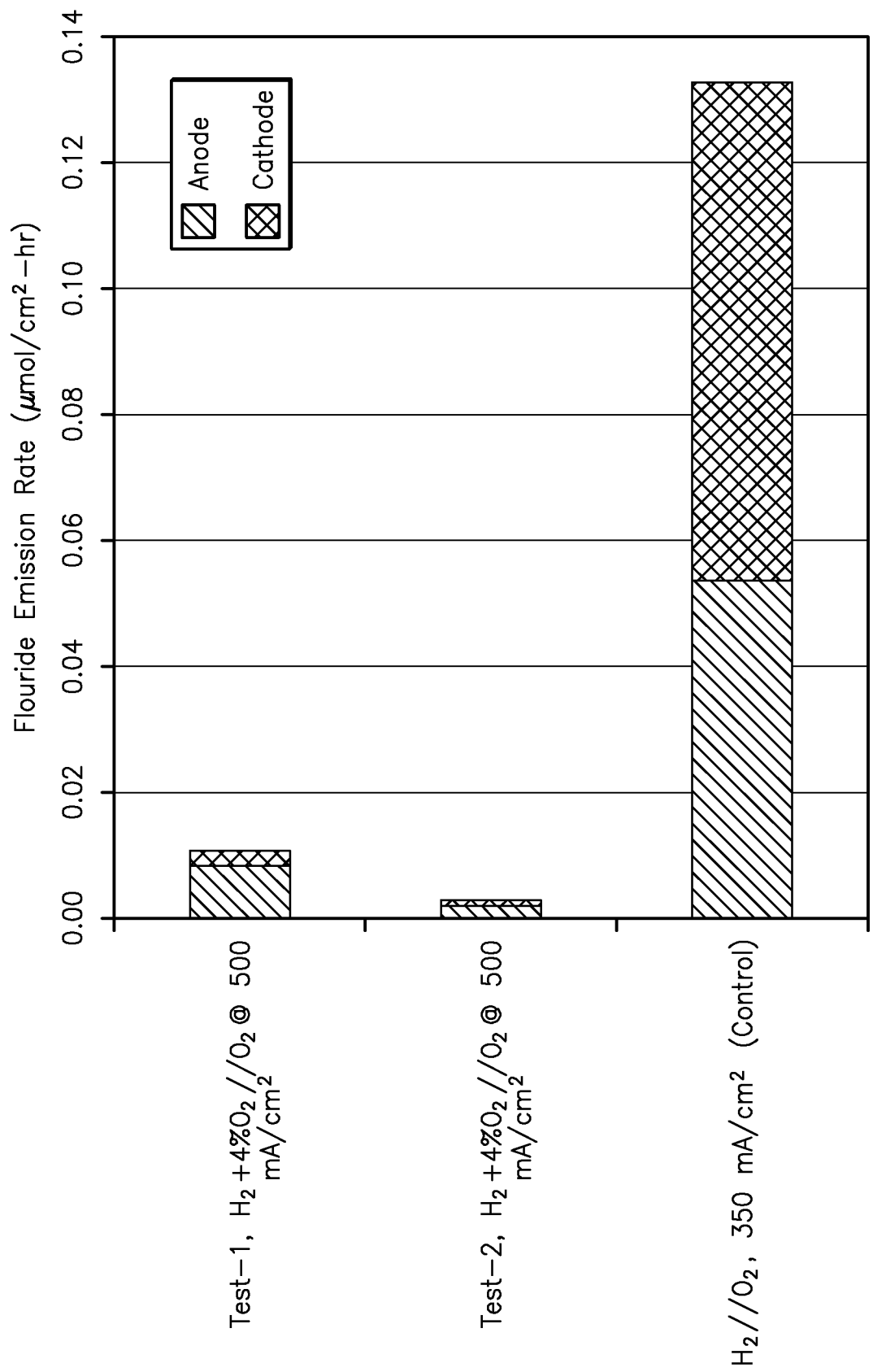
FIG. 6 illustrates fluoride emission rates for a baseline membrane and a membrane electrode assembly having both anode side and cathode side protective layers.

FIG. 6 shows replicate results obtained from evaluating an apparatus having both an anode-side protective layer and a cathode-side protective layer (i.e. the embodiment described by FIG. 3). This is compared to a baseline fuel cell which included neither layer. In this comparison, the protected fuel cell was operated at more extreme conditions than the baseline, which would have accelerated any attack, and yet FIG. 6 shows that the fuel cell protected with both layers is very effective at preventing decay of the fuel cell through erosion of the membrane.

It should be noted that there has been provided in accordance with the present disclosure a solution to the problem of oxygen and hydrogen crossover from the cathode and anode, respectively, in the form of protective layers which reduce oxygen crossing over through the cathode and form water, and/or oxidize hydrogen crossing over through the anode. This is particularly advantageous in that such crossover oxygen and/or hydrogen is consumed and removed without forming the peroxide and/or radicals which are known to lead to degradation of the membrane. In addition, efficient benign decomposition of any remnant peroxide and/or radicals that forms within the fuel cell are also provided.

Previous applications have described the benefits of various embodiments of protective layer structures, or underlayers, that aid in extending PEMFC membrane lifetime. Although the detailed mechanisms have yet to be completely elucidated, these protective layers enhance membrane durability by scavenging crossover hydrogen (when the underlayer is positioned between the anode and the membrane) and/or oxygen (when the underlayer is positioned between the cathode and the membrane). This scavenging eliminates radicals that are formed either indirectly by peroxide formation and subsequent decomposition at impurities, or directly from oxygen/hydrogen reaction on a suitable catalyst, or both.

There are 3 overall characteristics, listed below in decreasing order of importance, that an underlayer or protective layer must exhibit in order to be effective at preventing membrane degradation:

Characteristic 1 is effectiveness at scavenging crossover gases (either hydrogen or oxygen) by maximizing the ratio of gas reaction within the underlayer to gas diffusion through the underlayer.

Characteristic 2 is ability to maximize selectivity to benign products (such as water) for the crossover gas reactants and to minimize selectivity to harmful or potentially harmful species, such as hydrogen peroxide, hydroxyl radicals, or peroxyl radicals or the like.

Characteristic 3 is ability to maximize catalyst stability, since the underlayer may contain the "x0 plane" (i.e. the region of abrupt potential increase described in published patent application US20050196661(A1), which is incorporated herein by reference) in order to decrease the loss of catalyst to dissolution.

Incorporation of another layer into the MEA as an underlayer also introduces two negative issues for the MEA, as listed below.

Issue 1) is increased cost due to added catalyst.

Issue 2) is added performance loss due to increased ionic resistance.

The purpose for this aspect of the disclosure is to maximize the above characteristics and minimize the issues.

The parameters set forth below in Table 1 are generally desirable for any underlayer structure:

TABLE 1

| Parameter | Typical Range for Underlayers | Nominal Values for Underlayers | Enhances Characteristic # |
|---|---|---|---|
| 1) % porosity | 0%-10% | 3 | 1 |
| 2) vol % Ionomer | 50%-80% | 75% | 1 |
| 3) vol % Catalyst | 10%-50% | 25% | 1, 2 |

TABLE 1-continued

| Parameter | Typical Range for Underlayers | Nominal Values for Underlayers | Enhances Characteristic # |
|---|---|---|---|
| 4) % electrical connectivity between catalyst particles | 35%-75% | 70% | 1, 2, 3 |
| 5) Hydrophilic-Hydrophobic Balance of catalyst | | hydrophilic as possible | 1 |

Figure 7:
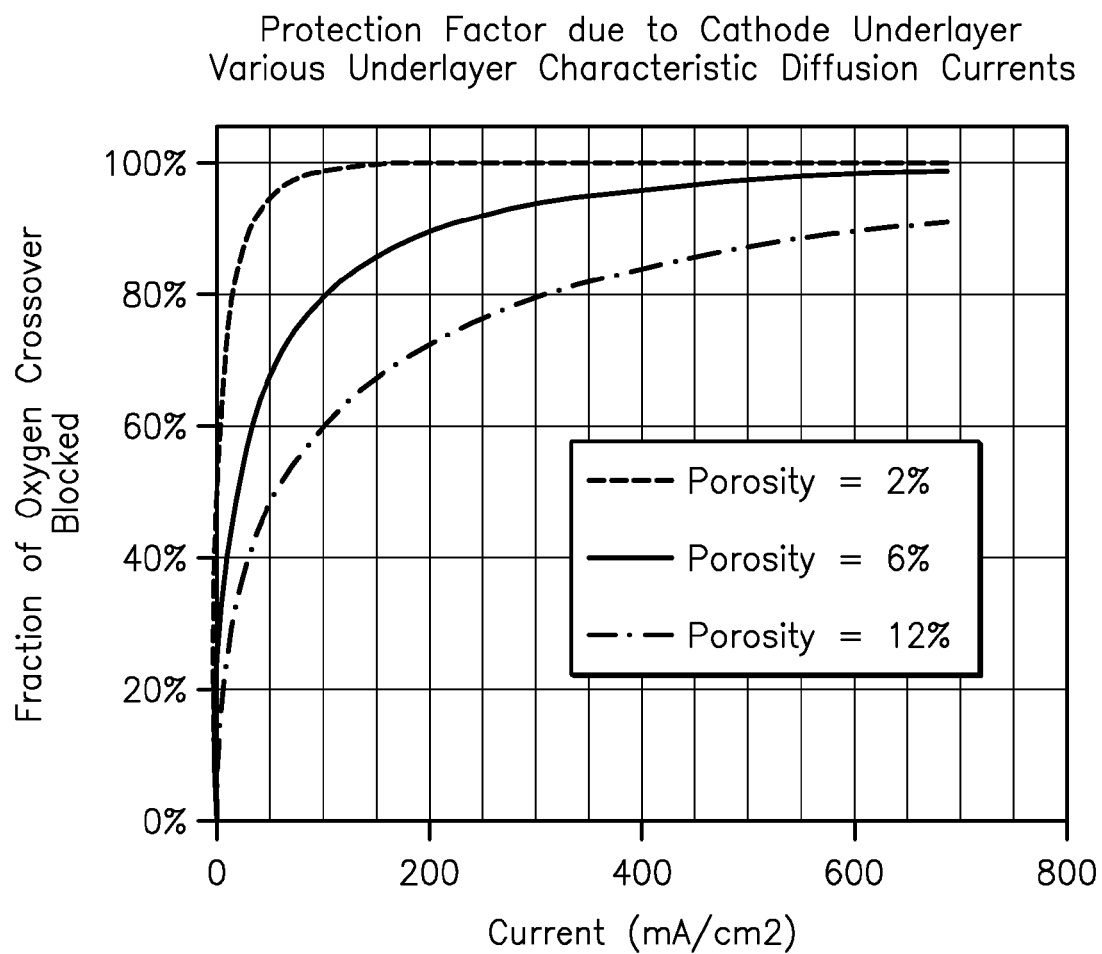
FIG. 7 shows model calculations for the fraction of crossover $O_2$ blocked as a function of cell current density for varying underlayer porosity.

Characteristic 1 is enabled partially by maintaining low degrees of open porosity in the underlayer of 0-10%, specified as Parameter 1. FIG. 7 shows model calculations for the fraction of crossover $O_2$ blocked as a function of cell current density for varying underlayer porosity. Assumptions in plotting FIG. 7 include an electrode porosity of ~50%, 80% of electrode pores filled with water, and both underlayer and electrode thickness of ~15 microns. Clearly, porosities of <10% are required for effective reduction of crossover $O_2$ over practical ranges of current density. This porosity requirement becomes even more stringent as thinner underlayers are employed for reduced cost and performance impact (underlayer thickness of less than or equal to 5 μm is considered practical).

Characteristic 1 is also enabled by high rates of gas scavenging, which is determined by Parameters 3 and 4. Parameter 3 specifies the volume fraction of the underlayer which is comprised of catalyst. The nominal value of 25% ensures a relatively high degree of electrical connectivity between the catalyst particles, which is estimated at 60-70% for this volume fraction. The catalyst and ionomer volume fractions can be traded to impart high connectivity (Parameter 4) or low porosity (Parameter 1). High ionomer and low catalyst volume fraction would reduce porosity, but result in catalyst particles that are mutually disconnected. The converse situation would result in high electrical connection but high porosity (more like a standard electrode). One goal of this disclosure is to relax this trade-off.

High connectivity is desired for high rates of gas scavenging reactions (through connection to the electrode) and catalyst selectivity/stability (Characteristics 2 & 3). Disconnected catalyst particles exposed to high local reactant concentrations may be subject to direct radical formation and/or catalyst dissolution. Characteristic 2 may also be enabled through high volume % catalyst (Parameter 3) since high concentrations of connected catalyst can scavenge radicals and decompose peroxide.

Previous patent applications have generally outlined selected metals for use in underlayers, whether as pure metals or metal particles supported on a carbon support. One example of such a configuration involves catalyst supported on carbon having a surface area of less than 250 $m^2/g$ and an active metal catalyst surface area of less than 10 $m^2/g$. This section discloses benefits of un-supported catalysts, for example unsupported Pt catalysts, or blacks, which are particulate catalysts of generally lower surface area, between 3 and 30 $m^2/g$, than supported Pt catalysts (60-80 $m^2/g$). These structures have several advantages over carbon supported catalysts. Table 2 summarizes these advantages for Pt catalysts.

TABLE 2

| Parameter | Value for carbon supported Pt catalysts | Value for unsupported Pt (blacks) | Unsupported enhances Characteristic # |
|---|---|---|---|
| 1) Pt specific activity (uA/cm$^2$) | 150-200 | >300 | 1 |
| 2) Specific area (m$^2$/g) | 60-80 | 3-30 | 3 |
| 3) Relative peroxide selectivity from O$_2$ reduction | High | Low | 1, 2 |
| 4) Mass activity (A/mg$_{Pt}$) | 0.2 | 0.1 | increases Issue 1 |

For an underlayer, the unsupported catalyst or black layer could be sputtered on the membrane, or coated on the membrane or the like. The layer is preferably coated onto both sides of the membrane, but especially on the anode side. The layer would consist of platinum black catalyst and ionomer. Alternatively, if uniform coating could not be obtained with low platinum black loadings, the platinum could be supported, but at very high weight percent, and on very low surface area carbon, such as Vulcite, which is highly graphitized Vulcan. A disadvantage of the unsupported catalysts is low mass activity, and a continuous layer may require higher catalyst loadings than economically feasible.

Previous patent applications have also outlined the general use of Pt alloys, explicitly stating Pt—Co and Pt—Ni as good combinations. Selected binary and ternary alloys have been shown to impart performance and durability advantages in both PEM and phosphoric acid fuel cells. Table 3 shows results from selected durability tests for supported catalysts comparing Pt (Pt/C) to selected binary (Pt0.75-Co0.25/C) and ternary (Pt0.50-Ir0.25-Co0.25/C) alloys. Higher alloy catalyst activity reflects higher oxygen reduction selectivity to water, and allows lower catalyst loadings to be used for equal benefit to enhance Characteristic 1 and mitigate Issue 1. This, in turn, allows thinner underlayers to be used to mitigate Issue 2. Higher stability of these selected alloys enhances Characteristic 3.

TABLE 3

| Parameter/ Value (strongly enhances) | Pt/C | Pt$_{0.75}$—CO$_{0.25}$/C | Pt$_{0.50}$Ir$_{0.25}$CO$_{0.25}$/C |
|---|---|---|---|
| 1) % Catalyst surface loss after cycling | 50 | 37 | 12 |
| 2) Specific activity (uA/cm$^2$ at 900 mV) | ~100 | ~250 | ~170 |
| 3) Characteristic enhanced by alloy | n/a | 1, 2, 3 | 1, 2, 3 |
| 4) Issue mitigated by alloy | n/a | 1, 2 | 1, 2 |

Binary and ternary alloys may be incorporated into underlayer structures in any of the following configurations.

One configuration uses both carbon supported and non-supported catalysts composed of binary alloys Pt$_x$Y$_{1-x}$, where Y can be Co, Ni, V, Cu, Fe, Cr, Pd, Ti, W, Al, Ag, and/or Cu, and x can range from 0.1 to 0.9.

Another configuration uses both carbon supported and non-supported catalysts composed of ternary alloys Pt$_x$M$_y$Y$_{1-x-y}$, where M can be Ir, Rh, Co, and/or Ni, Y can be Co, Ni, V, Cu, Fe, Cr, Pd, Ti, W, Al, Ag, and/or Cu, and x & y can range from 0.1 to 0.9.

Still another configuration uses both carbon supported and non-supported catalysts composed of Pt$_x$Z$_{1-x}$, wherein Z can be Ruthenium and/or Molybdenum, and x can range from 0.1 to 0.9.

Figure 8:
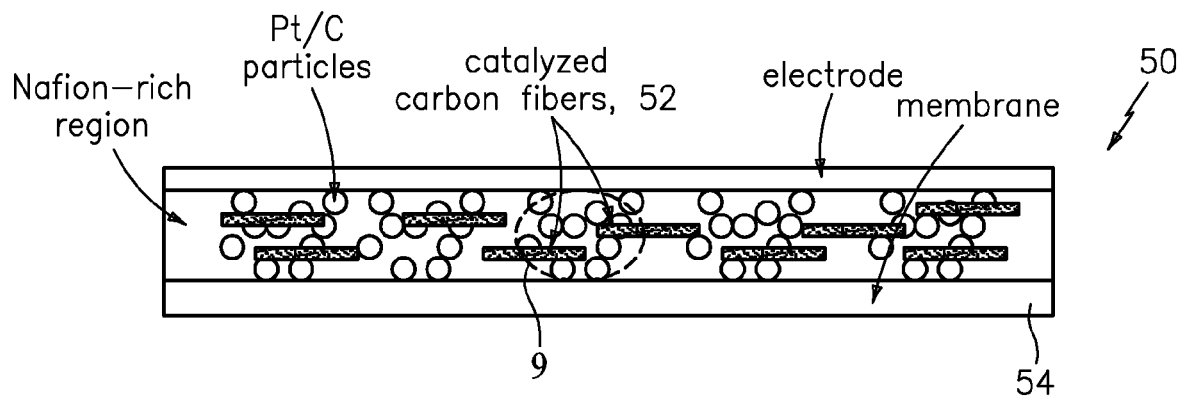
FIG. 8 illustrates an embodiment having a specific catalyst layer structure.

FIG. 8 shows an underlayer 50 with structures 52 designed to impart lateral porosity. Lateral porosity is desirable as it encourages lateral flow of any possible cross over gases and increases the likelihood that underlayer 50 can prevent such gases from reaching membrane 54.

This lateral porosity can be attained using catalyzed or uncatalyzed platelet-like structures; catalyzed or uncatalyzed nanotube structures; pure element (for example Pt) or alloy nanofiber structures; and combinations thereof with noble-metal supported C particles. These various structures have dimensions and/or other flow altering characteristics which are positioned to block straight crossover flow of gas through layer 50, thereby increasing the length of the flow path of such gases through layer 50 and increasing the likelihood that such gases will be scavenged by catalyst in layer 50. These structures, when incorporated into layer 50, provide a lateral porosity (or gas permeability) in layer 50 which is greater than direct crossover porosity of layer 50. Table 4 shows analysis of these configurations.

TABLE 4

| Lateral Structure | Primary effect | Characteristic enhanced | Issue mitigated |
|---|---|---|---|
| 1) Catalyzed platelet, nanofiber, or nanotube | increase reactant gas contact to catalyst | 1 | 1, 2 |
| 2) Uncatalyzed nanofiber with other catalyst | increase connectivity among other catalyst | 1 | 1 |
| 3) Pure Pt/Pt-alloy nanofiber | Benefits of 1 + alloy + unsupported benefits | 1, 2, 3 | 1, 2 |

Figure 9:
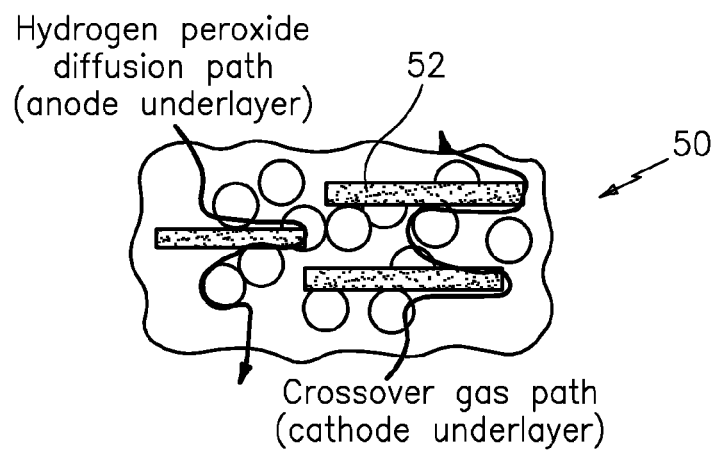
FIG. 9 is an enlarged portion of FIG. 8.

Platelet structures such as would be attained by graphitic sheets are shown in FIGS. 8 and 9. Assuming that the catalyzed fiber structures have rotational symmetry in the in-plane dimension, structure and gas flow would be as shown. This disclosure expands previous disclosures to focus on lateral porosity or gas permeability and its benefits. Platelets may be provided as catalyzed, uncatalyzed, or mixtures/combinations of the two in appropriate amounts into the underlayer. By "catalyzed", it means that such structures support catalyst particles which facilitate the oxidation/reduction reactions present in a PEM fuel cell (e.g. Pt or Pt alloys). By "platelet", it is intended that such a structure have substantially equivalent dimensions in the "in-plane" dimension, while being substantially thinner in thickness, or substantially perpendicular to the "in-plane" dimension.

Because of sub-nanometer dimensions, carbon nanotubes (e.g. single wall nanotubes or SWNT's) may be used to attain substantially the same effect as a platelet, in that they may spread substantially throughout the in-plane dimension while maintaining electrical connectivity. Note that the SWNT's may be provided as catalyzed, uncatalyzed, or mixtures of the two, also with or without accompanying traditional supported noble metal catalysts. In particular, the use of nanotubes or nanofibers mixed with carbon-supported catalysts may be a particularly advantageous and straightforward combination, in that the nanotubes facilitate a high degree of electrical connectivity between these particles.

By including a mixture of nanotubes or nanofibers within a traditional underlayer structure, the catalyst/porosity trade-off may be relaxed. As shown in FIGS. 8 and 9, domains of supported catalyst that otherwise would be disconnected electrically could be connected by these interstitial nanotube or nanofiber structures. Thus, such structures may be used to attain substantially thinner underlayer structures having proportionally lower catalyst loadings.

Note also that these nanostructures, particularly SWNT's, may provide conduits for gas transport. When these structures are positioned substantially in the in-plane dimension of an underlayer, the lateral transport of gases may be enhanced, thus attaining increased effective tortuosity as desired.

Recent work by 3M has shown that pure Pt and Pt alloy nanowhisker structures can be advantageously used in fuel cell cathodes. Such Pt or Pt-alloy structures can also advantageously be used in an underlayer. The preferred orientation of these structures is in-plane, as shown in FIGS. 8 and 9 for the catalyzed carbon fibers. The alloy compositions for these are described above. As indicated in row 3 of Table 4, this represents a particularly desirable mode of the catalyst in the underlayer, where all the benefits of catalyst type and structure are consolidated.

PEM membranes change dimension upon hydration, and such dimensional change may disrupt the underlayer efficacy by increasing porosity which could impact Characteristic 1 detrimentally. Two additional concepts, namely composite cathode structures and a structural approach to minimize cracking of the underlayer, are outlined to help improve the tolerance of the underlayer to dimensional changes.

Figure 10:
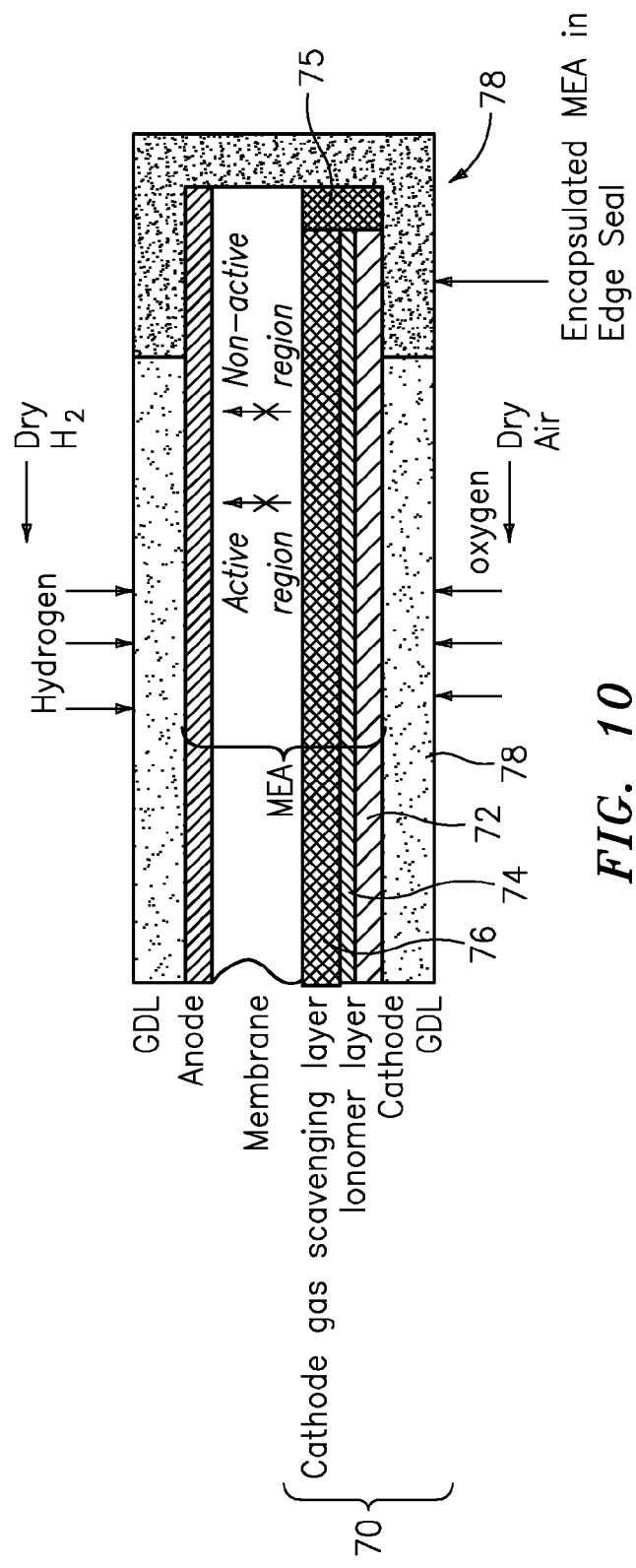
FIG. 10 illustrates a composite cathode structure, particularly in the seal region, according to an embodiment of the present disclosure.

FIG. 10 shows a composite electrode 70 which includes a regular electrode 72, an ionomer isolation layer 74, and a nearly non-porous catalyst layer or underlayer 76 impregnated with ionomer. Gas diffusion layer 78 is also considered a part of this composite electrode 70. The regular electrode is electrically connected to the catalyzed layer on the edge of the MEA but separated from the electrode in the active area. The catalyzed layer serves as the crossover reactant scavenging electrode. The ionomer layer restricts the dimensional change of the scavenging layer when the cell is subjected to cyclic humidity conditions. In addition, unlike an underlayer that is connected to the cathode in almost the entire area, for which the metal potential is the same for the UL and the electrode, in this embodiment the metal potential in this scavenging layer can be modified to increase effectiveness by altering the resistance of the connection underneath the seal region 78. The configuration is also illustrated in FIG. 10.

For transportation applications with solid plate, where internal humidification is not available and cyclic humidity and load is ubiquitous, the underlayer function may be compromised. Oxygen concentration increase in this catalyst layer would lead to more aggressive Pt dissolution and reduced mitigation efficacy arising from increased oxygen permeability and direct contact with oxygen. Therefore, this configuration is expected to maintain the structure of the gas scavenging layer, lower the oxygen concentration therein, and improve electrochemical gas scavenging efficiency for PEM fuel cells in transportation applications with cyclic drive conditions and the absence of internal humidification.

As mentioned above, FIG. 10 shows a preferred UEA configuration that has a composite cathode 70 wherein a non-porous ionomer layer 74 is embedded under the active region. The oxygen scavenging layer 76 is electrically connected to the cathode 72 in the non-active region, for example through connection 75. This concept limits concentration of oxygen in scavenging layer 76 and thereby restricts dimensional change of this layer.

Another aspect of this disclosure provides ways of minimizing the sizes of cracks in a protective underlayer which occur because of membrane expansion upon hydration. It is assumed that many small cracks in a protective layer is a far better case than fewer, larger cracks of the same total area and that cracks smaller than a critical dimension will not harm the effectiveness of the protective layer, e.g., small cracks in an underlayer designed to reduce oxygen and prevent crossover would allow oxygen to diffuse to and react at the sidewalls of the crack.

The actual area contained in cracks is fixed by the expansion of the membrane. The crack size is controlled by the number of cracks nucleated. Nucleation of a multitude of cracks will result in a small crack size. Nucleation in this embodiment is affected by inclusion of large particles in the electrode inks from which the underlayers are formed. For example, the electrodes can be about 10 microns thick. If a small weight fraction of 7-micron particles of carbon are added to the electrode inks, these particles would weaken the electrode where they are incorporated. This would cause the electrode to crack in that area. Therefore, a multitude of cracks would form rather than one large one.

Calculations show that a loading under 1 wt % of 7 micron carbon particles would be enough to accommodate 20% expansion of the membrane with cracks no larger than 10 microns. Thus, incorporation of carbon particles having a large particle size, for example between 60 and 90% of the thickness of the protective layer, more preferably between 65 and 75%, can help address expansion of the membrane by forming a multitude of relatively small cracks in the underlayer due to such expansion.

Large particle size catalyst can preferably constitute less than 20% of a total weight of catalyst in the protective layer, preferably between 5 and 20% and most preferably between 7 and 12%.

Further, use of hydrophobic materials such as carbon, Teflon, and the like will keep such cracks from flooding with water, and use of hydrophilic materials such as oxidized carbon, titania, zirconia, niobium oxide, or other materials compatible with the PEM environment, will cause the cracks to fill with water. While control of the water affinity of such cracks is an aspect of this disclosure, current understanding and goals would suggest that the latter situation is most preferable to the present underlayer concept for use in PEM. An extension of this concept is made to include limitation of crack size in any brittle layer, such as an electrode or an oxide filled layer.

This concept will limit the crack size in a brittle electrode or underlayer resulting from membrane expansion. Use of hydrophilic materials will cause the cracks to fill with water thereby inhibiting gas crossover.

Underlayers are most clearly distinguished from electrodes through Parameters 1, 2, and 5 (Table 1). Respectively, electrodes are designed to have high open (~50 vol %) porosity, only 25 vol % ionomer, and are hydrophobic to reject generated water and avoid flooding. All of these characteristics minimize reactant mass transport losses in electrodes, which are actually maximized in underlayer structures.

Parameter 1 is maintained through Parameters 2 and 5. Parameter 2 maintains low porosity by substantially filling the underlayer with ionomer. Since the underlayer must contain catalyst to scavenge crossover gases, the porosity should exist in proximity with the catalysts. This remaining porosity is preferentially filled with water by making the catalysts as hydrophilic as possible, specified as Parameter 5. This will result in this remaining porosity being filled with water, either generated from crossover gas reaction or held there from transport through the membrane. This reduces the effective gas diffusivity through that layer, since diffusion coefficients are many times slower through water than through open pores.

There are exceptions to the high degrees of electrical connectivity in alternate embodiments of the underlayer technology described previously. Reduced degrees of electrical connection of underlayers to their respective electrodes can be implemented to either effect a desired potential drop within the layer (with respect to the associated electrode), as in co-pending, commonly owned U.S. application Ser. No. 10/795,181, or to have domains exist within the layer that are both electrically connected and disconnected, as in co-pending, commonly owned U.S. application Ser. No. 10/867,305. The reasons for having part or all of the protective layer or underlayer at potentials different than the associated electrode include the following.

Changing the degree of electrical connection of the cathode underlayer to the cathode allows it to operate at lower potentials than the cathode to 1) enhance the kinetics of oxygen reduction, and/or 2) enhance the kinetics of peroxide decomposition, and/or 3) reduce the kinetics of catalyst dissolution that occur at higher potentials.

Such different potentials also allow the anode underlayer to operate at higher potentials than the anode to enhance the kinetics of peroxide decomposition.

Further, this difference in potential can be manipulated to position either underlayer within the "x0" region, which is known to be a region where membrane attack occurs.

In general, however, the underlayer should preferentially maintain high degrees of electrical connection to the electrode.

Figure 10A:
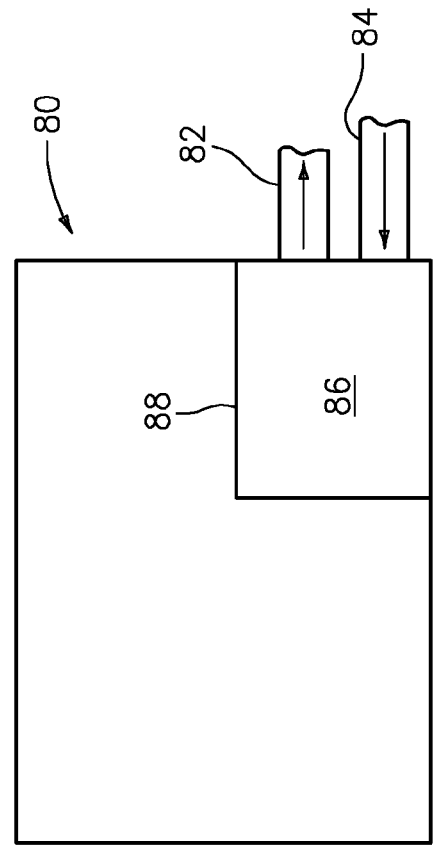
FIG. 10a illustrates an embodiment of the invention using a protective layer at only a select area of the MEA.

In cells not affected by contamination or localized mechanical stresses, membrane failures occur in specific and constant areas. For example, FIG. 10a shows a cell 80 having a coolant exit 82 and air inlet 84 that are close to each other. This results in the membrane at this area 86 being the hottest and also in contact with the highest oxygen content. Membranes typically fail in this area. A solution to improve cell life is to use an underlayer or protective layer 88 locally in this vulnerable area 86. For example, use of underlayer 88 slightly oversized only to cover the region of air inlet 84 would result in overall Pt loading reduction as compared to a continuous underlayer. The underlayer in the vulnerable spots can be cathode and/or anode sided. The benefit of localized underlayers is lower catalyst loading and reduction in the performance loss due to additional layers.

Thus, an underlayer can be positioned in some but not all areas of a cell to provide localized protection while reducing the amount of potentially expensive materials needed to make the assembly. One preferred example is where one area of the cell is subjected to both highest temperature and high oxygen content. Of course, other vulnerable areas of a cell may exist which could likewise be protected through a selectively positioned partial underlayer.

The advantages of potential drop within the underlayer as described above may be realized, in addition to connectivity effects also as described above, by using a catalyst or catalyst support with limited electronic conductivity. Reduced and doped oxides such as $Nb:TiO_2$ are one class of materials. A subset of these materials is mixed ion conductors. Mixed-ion conductors are materials that possess both electronic and ionic conductivity. In the present case, primary interest is where the ion is a proton. These materials usually are composed of transition metal oxides and their electronic conductivity derives from the mixed valence states of the metal within the oxide. The ionic conductivity comes from their ability to easily form a hydroxide. Some of these materials may support oxygen reduction, but if not sufficiently active the materials may be catalyzed.

Specific materials are listed below and include mixed ion conductors examined for electrode catalyst supports in the past. These have never been used because of their poor electronic conductivity, but may be useful in underlayers.

A general class of such materials is bronzes. Sodium tungsten bronzes are a prototype. $Na_xWO_3$ is stable with $0 \leq x \leq 0.9$. Of interest would be $H_{2-x}WO_4$, and $WO_3$ at least on the surface. Other ions are Li, Cd, U, Th and the like. Other bronzes include $MoO_3$ and the like.

Cubic oxides such as $La_xTiO_3$, $Sr_xNbO_3$, are also desirable.

Perovskites like BaTiO3, doped with Nb, Ta, Sb or the like can be utilized.

Phosphotungstic acid and phosphozirconic acid, possibly doped for conductivity, are also a class of suitable materials.

Fluorite structures such as $ZrO_2$, $CeO_2$, $TiO_2$ either pure, mixed or doped, can be used.

Pthalocyanines and metal doped phthalocyanines, such as Fe, Co or other transition metals, either molecular or pyrolyzed onto a catalyst support can be used.

The above materials may be catalyzed with Pt, Au, or not catalyzed. The materials may become catalyzed in the cell by precipitation of metallic Pt from ions dissolved from the cathode or from the membrane. The materials may be catalyzed in-situ.

Underlayers would be made in the normal way by mixing PFSA or other polymeric ionomer with the mixed ion conductor to form the underlayer.

Mixed-ion, and specifically mixed-proton conductors have the advantage of adding to the proton conductivity of the underlayer-ionomer. These materials are hydrophilic and will aid in water retention at lower relative humidities. They also may improve the ionic conductivity of the ionomer by providing interfaces more favorable for proton conduction.

Therefore, the mixed ion conductors may allow lower performance loss by $iR_{UL}$, or for the same $iR_{UL}$ penalty, the underlayer may be made thicker for more effectiveness.

Mixed-proton conductors will provide an electronic path to consume oxygen by oxygen reduction reaction and to reduce Pt-ion to Pt metal thereby preventing $O_2$ and Pt from entering the membrane as in conventional underlayers.

These semiconducting, i.e., resistive materials offer advantages not possible with the present Pt/C materials.

With present materials which are highly conducting, the metal potential of the underlayer is essentially constant and at the same potential as the cathode. Therefore, to consume oxygen in the underlayer, the cathode potential must be significantly below OCV. This means the cell must be under load (~350 mA/cm²). As the performance of MEA's advance, so too must the current.

Using a resistive material to support the Pt in the underlayer, the metal potential will fall because of $iR_{electronic}$ in the underlayer. Therefore, the metal potential of the underlayer will decrease as one moves away from the cathode towards the membrane. The result will be that the load current required for a given level of protection, as well as $O_2$ penetration into the membrane, will be decreased.

Depending on the resistance catalytic activity of the mixed ion conductors, it may be possible to provide protection at open circuit without an anode underlayer. An MEA structure that would allow such protection would have an anode, a membrane, a cathode-side underlayer and a cathode similar to the layers illustrated in FIG. 10.

The membrane can be made thin enough so that the hydrogen crossover which penetrates the cathode-side underlayer requires a current large enough to cause an iR drop in the cathode-side underlayer to electrochemically consume all oxygen permeating the underlayer from the cathode while still in the cathode-side underlayer.

The cathode-side underlayer can be composed of material or materials which cause enough metallic potential drop in the cathode-side underlayer and have sufficient oxygen reduction reaction activity to consume all of the oxygen permeating the cathode-side underlayer from the cathode while in the cathode-side underlayer.

Having established this situation for oxygen consumption, the situation for Pt-ion migration into the membrane will be analogous to the oxygen. Pt ions will be reduced to metal within the cathode-side underlayer, thus enhancing the effectiveness of the cathode-side underlayer.

Further benefits may be realized with mixed ion conductors by using mixtures of catalysts, underlayers composed of layers of different ionomer materials and graded compositions.

A further aspect of the present disclosure is to prevent the presence in the membrane of certain substances that catalyze the reaction which forms free radicals.

Figure 11:
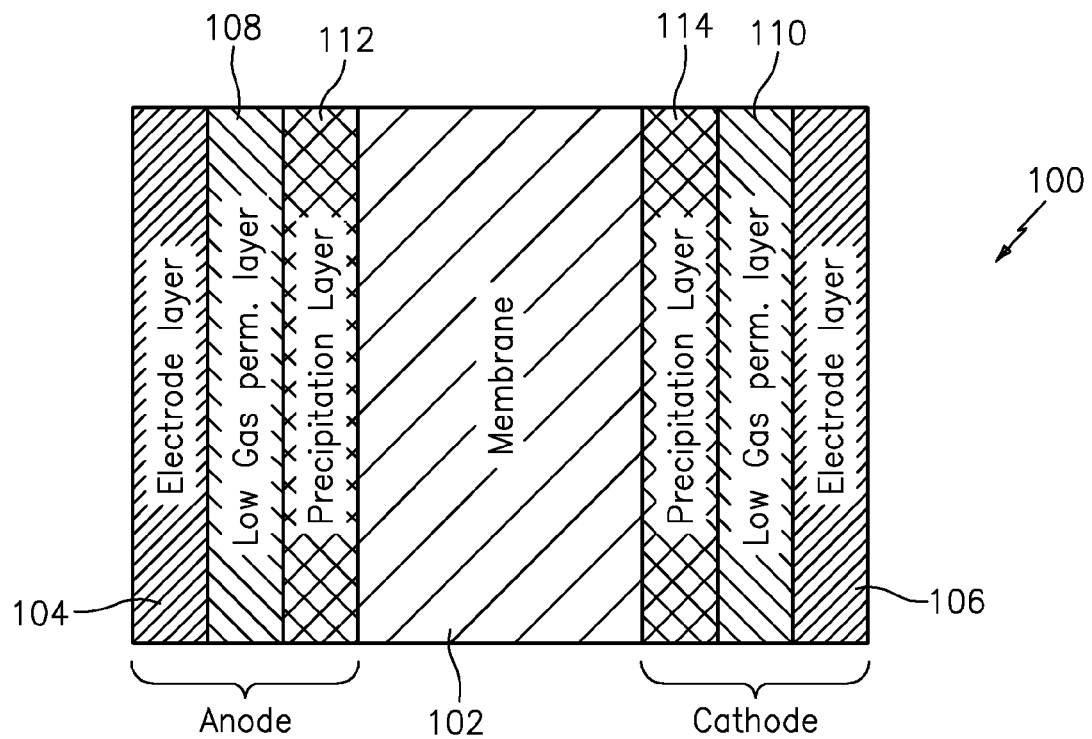
FIG. 11 shows an MEA having precipitation layers and gas permeability layers.

One source of such substances is catalyst ion migration, and prevention of this migration is a further embodiment of this disclosure. FIG. 11 shows an MEA 100 having membrane 102, anode electrode layer 104 and cathode electrode layer 106, all similar to embodiments discussed above. In this embodiment, protective layers 108, 110 can also be positioned on membrane 102 facing surfaces of electrode layers 104, 106. These protective layers 108, 110 can suitably be low gas permeability layers as discussed above.

Still referring to FIG. 11, one or more precipitation layers 112, 114 can be incorporated into MEA 100.

The function of precipitation layers 112, 114 is to convert ionic Pt/catalyst metal to metallic form and prevent any dissolution of the metal and migration of the ions into the membrane. In addition, with the right choice of nucleation site material, OH radicals can be benignly quenched. Examples of such material include carbon or platinum. Such a layer 112, 114 would have several nucleation sites for precipitation of catalyst. Examples of materials with such nucleation sites are larger particles of platinum, carbon, Au, Teflon or the like.

Precipitation is favorable at low potentials on larger particles (particle size greater than about 5 nm). Therefore, the preferred embodiment is a layer that is totally or partially disconnected from the electrode to have lower potential than cathode. To minimize protonic resistance, this layer has high ionomer content with a predetermined amount of the nucleation sites. The nucleation site concentration ($C_{nucl.\ sites}$) in the ionomer is determined such that the time for diffusion in the layer is greater than the time to find and nucleate at a site. In other words:

$$C_{nucl.sites} \gg \frac{D_{Pt}}{L_{PL}^2 k_{nucl}}$$

Where $D_{pt}$ is the diffusion coefficient of Pt ions, $L_{PL}$ is the thickness of the precipitation layer and $k_{nucl}$ is a nucleation constant.

While FIG. 11 shows protective layers or underlayers 108, 110 between electrodes 104, 106 respectively and precipitation layers 112, 114, respectively, the reverse configuration could also be utilized, with underlayers being between the membrane and the precipitation layer.

Figure 12:
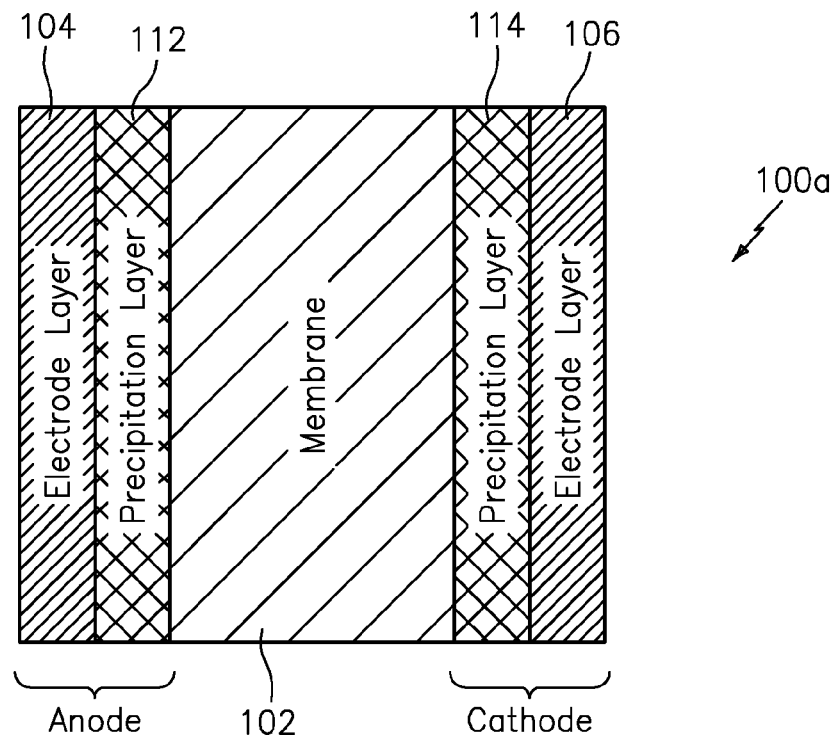
FIG. 12 shows an MEA having only precipitation layers.

FIG. 12 shows a further embodiment wherein MEA 100a has precipitation layers 112, 114, but no protective layers. This embodiment relies upon prevention of catalyst dissolution to increase life of the fuel cell. Layers 112, 114 capture any migrating ions and prevent transport of such ions into the membrane.

Precipitation layers 112, 114 are advantageously layers having a dispersion of precipitating agent and ionomer solution. The precipitating agent can be platinum black, carbon nanofibers, gold on carbon, Au/Ni on carbon, and the like. The mixture of the precipitating agent and the ionomer solution can be sprayed on the membrane before laying the underlayers. Of course, other methods of preparation are also possible.

Precipitation layers 112, 114 can be positioned into MEA 100, 100a during manufacture in numerous ways. In one approach, a very fine layer of carbon, Teflon, or platinum is dispersed on the membrane prior to application of the electrodes. This may not provide as effective precipitation as other approaches. However, such a very fine layer could capture a good portion of the Pt or metal ions.

Selective Pt precipitation can be achieved by cycling the potential of the cell under $H_2/N_2$ environment, to precipitate platinum at the interface of the membrane and electrode that sees $N_2$. Results from selective Pt deposition in the membrane close to the cathode electrode interface as happens when layers 112, 114 are used, showed a 3-4× reduction in FER as compared to a sample without the selective Pt layer. This suggests that the migration of Pt ions is reduced by the precipitation layer, which reduced Pt migration into the bulk of the membrane. This embodiment provides a cost effective method to mitigate membrane degradation based upon both free radical quenching by carbon and dissolved Pt collection and precipitation by carbon that is mostly electronically disconnected with the electrode.

The precipitation layer is distinctly different from previously discussed underlayers or protective layers because of electrical connectivity to the electrode. Further, the functionality of this layer is to provide sites to capture Pt ions, grow Pt precipitate to larger particles, and to quench OH radicals. Subsequently, additives can be added to this carbon layer to facilitate crystal growth. Such additives can include platinum black, functionalized carbon, carbon nanofibers, gold on carbon, gold shell on nickel core on carbon, and the like.

Alternative materials can be used in precipitation layers 112, 114, in addition to and/or instead of carbon, to serve the same purposes. Examples of these materials include ceramic, metal, catalyzed polymers and the like.

While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

The invention claimed is:

1. A membrane electrode assembly, comprising:
    an anode;
    a cathode;
    a membrane between the anode and the cathode; and
    a protective layer between the membrane and at least one electrode of the anode and the cathode, the protective layer comprising a layer of ionomer material containing a catalyst, the layer having a porosity of between 0 and 10%, an ionomer content of between 50 and 80% vol., a catalyst content of between 10 and 50% vol., and an electrical connectivity between catalyst particles of between 35 and 75%, and further wherein the layer has a thickness of less than or equal to about 5 µm, and wherein the catalyst is supported on carbon having a surface area of less than 250 m2/g and has an active metal catalyst surface area of less than 10 m2/g.

2. The assembly of claim 1, wherein the protective layer has a porosity of <3%, an ionomer content of 75% vol., a catalyst content of 25% vol., and an electrical connectivity between catalyst particles of 70%.

3. The assembly of claim 1, wherein the layer is hydrophilic.

4. A membrane electrode assembly, comprising:
an anode;
a cathode;
a membrane between the anode and the cathode; and
a protective layer between the membrane and at least one electrode of the anode and the cathode, the protective layer comprising a layer of ionomer material containing a catalyst, the layer having a porosity of between 0 and 10%, an ionomer content of between 50 and 80% vol., a catalyst content of between 10 and 50% vol., and an electrical connectivity between catalyst particles of between 35 and 75%, and further wherein the layer has a thickness of less than or equal to about 5 µm, and wherein the catalyst is an un-supported catalyst having an active metal catalyst surface area of between 3 and 30 m$^2$/g.

5. The assembly of claim 1, wherein the catalyst comprises a platinum alloy.

6. The assembly of claim 1, wherein the catalyst comprises a binary or ternary platinum alloy.

7. The assembly of claim 1, wherein the catalyst comprises:
a binary alloy having the formula $Pt_xY_{1-x}$, where Y can be Co, Ni, V, Cu, Fe, Cr, Pd, Ti, W, Al, Ag, and/or Cu, and x can range from 0.1 to 0.9;
$_xM_yY_{1-x-y}$, where M can be Ir, Rh, Co, and/or Ni, Y can be Co, Ni, V, Cu, Fe, Cr, Pd, Ti, W, Al, Ag, and/or Cu, and x and y can range from 0.1 to 0.9, wherein the catalyst is supported on carbon.

8. The assembly of claim 1, wherein the catalyst comprises a platinum-cobalt binary alloy.

9. The assembly of claim 1, wherein the catalyst comprises a platinum-iridium-cobalt ternary alloy.

10. The assembly of claim 1, wherein the catalyst comprises functionalized carbon.

11. The assembly of claim 1, wherein the catalyst comprises carbon selected from the group consisting of furnace blacks, acetylene blacks, active carbons, natural or synthetic graphite, pulverized glassy carbon, carbon fibers and mixtures thereof.

12. The assembly of claim 1, wherein the catalyst has greater lateral gas permeability than through-plane gas permeability.

13. The assembly of claim 12, wherein the protective layer comprises electrically conductive platelet structures.

14. The assembly of claim 12, wherein the protective layer comprises electrically conductive nanotube structures.

15. The assembly of claim 12, wherein the protective layer comprises electrically conductive nanofiber structures.

16. The assembly of claim 1, wherein the catalyst or catalyst support is a mixed ion conductor.

17. The assembly of claim 16 where the mixed ion conductor is a bronze material.

18. The assembly of claim 17, wherein the bronze material is a tungsten bronze.

19. The assembly of claim 18, wherein the tungsten bronze comprises sodium tungsten bronze.

20. The assembly of claim 16, wherein the mixed ion conductor is selected from the group consisting of pthalocyanines, metal doped phthalocyanines and combinations thereof.

21. The assembly of claim 16, wherein the mixed ion conductor is selected from the group consisting of phosphotungstic acid, phosphozirconic acid and combinations thereof.

22. The assembly of claim 16, wherein the mixed ion conductor is catalyzed with platinum, gold or mixtures thereof.

23. The assembly of claim 1, wherein the catalyst or catalyst support comprises a resistive material.

24. The assembly of claim 23, wherein the resistive material is selected from the group consisting of cubic oxides, perovskites, pthalocyanines, metal doped phthalocyanines, fluorite structures, and combinations thereof.

25. The assembly of claim 23, wherein the resistive material is catalyzed with platinum, gold or mixtures thereof.

26. The assembly of claim 1, further comprising an ionomer isolation layer between the at least one electrode and the protective layer, where the electrode and the underlayer are connected at discrete locations throughout the layer.

27. The assembly of claim 26, wherein the at least one electrode, the isolation layer and the protective layer define, in combination, a composite electrode structure.

28. The assembly of claim 1, wherein the at least one electrode is the cathode.

29. The assembly of claim 1, wherein the protective layer has a thickness, and wherein the catalyst includes large particles having a particle size which is between 60 and 90% of the thickness of the protective layer.

30. The assembly of claim 1, wherein the protective layer has a thickness, and wherein the catalyst includes large particles having a particle size which is between 65 and 75% of the thickness of the protective layer.

31. The assembly of claim 29, wherein the large particles constitute less than 20% of a total weight of the catalyst in the protective layer.

32. The assembly of claim 29, wherein the large particles constitute between 5 and 20% of a total weight of the catalyst in the protective layer.

33. The assembly of claim 29, wherein the large particles constitute between 7 and 12% of a total weight of the catalyst in the protective layer.

34. A membrane electrode assembly, comprising:
an anode;
a cathode;
a membrane between the anode and the cathode; and
a protective layer between the membrane and at least one electrode of the anode and the cathode, the protective layer comprising a layer of ionomer material containing a catalyst, wherein the layer has a porosity of between 0 and 10%, an ionomer content of between 50 and 80% vol., a catalyst content of between 10 and 50% vol., wherein the layer has a thickness of less than or equal to about 5 µm, wherein the layer is selectively positioned in areas of the assembly, and wherein the catalyst is supported on carbon having a surface area of less than 250 m$^2$/g and has an active metal catalyst surface area of less than 10 m$^2$/g.

35. The assembly of claim 4, wherein the protective layer has a porosity of <3%, an ionomer content of 75% vol., a catalyst content of 25% vol., and an electrical connectivity between catalyst particles of 70%.

36. The assembly of claim 4, wherein the layer is hydrophilic.

37. The assembly of claim 4, wherein the catalyst comprises a platinum alloy.

38. The assembly of claim 4, wherein the catalyst comprises a binary or ternary platinum alloy.

39. The assembly of claim 4, wherein the catalyst comprises:
   a binary alloy having the formula $Pt_xY_{1-x}$, where Y can be Co, Ni, V, Cu, Fe, Cr, Pd, Ti, W, Al, Ag, and/or Cu, and x can range from 0.1 to 0.9;
   or a ternary alloy having the formula $Pt_xM_yY_{1-x-y}$, where M can be Ir, Rh, Co, and/or Ni, Y can be Co, Ni, V, Cu, Fe, Cr, Pd, Ti, W, Al, Ag, and/or Cu, and x and y can range from 0.1 to 0.9.

40. The assembly of claim 4, wherein the catalyst comprises a platinum-cobalt binary alloy.

41. The assembly of claim 4, wherein the catalyst comprises a platinum-iridium-cobalt ternary alloy.

42. The assembly of claim 4, wherein the catalyst comprises functionalized carbon.

43. The assembly of claim 4, wherein the catalyst comprises carbon selected from the group consisting of furnace blacks, acetylene blacks, active carbons, natural or synthetic graphite, pulverized glassy carbon, carbon fibers and mixtures thereof.

44. The assembly of claim 4, wherein the catalyst has greater lateral gas permeability than through-plane gas permeability.

45. The assembly of claim 44, wherein the protective layer comprises electrically conductive platelet structures.

46. The assembly of claim 44, wherein the protective layer comprises electrically conductive nanotube structures.

47. The assembly of claim 44, wherein the protective layer comprises electrically conductive nanofiber structures.

48. The assembly of claim 4, wherein the catalyst or catalyst support is a mixed ion conductor.

49. The assembly of claim 48 where the mixed ion conductor is a bronze material.

50. The assembly of claim 49, wherein the bronze material is a tungsten bronze.

51. The assembly of claim 50, wherein the tungsten bronze comprises sodium tungsten bronze.

52. The assembly of claim 48, wherein the mixed ion conductor is selected from the group consisting of pthalocyanines, metal doped phthalocyanines and combinations thereof.

53. The assembly of claim 48, wherein the mixed ion conductor is selected from the group consisting of phosphotungstic acid, phosphozirconic acid and combinations thereof.

54. The assembly of claim 4, wherein the catalyst or catalyst support comprises a resistive material.

55. The assembly of claim 54, wherein the resistive material is selected from the group consisting of cubic oxides, perovskites, pthalocyanines, metal doped phthalocyanines, fluorite structures, and combinations thereof.

56. The assembly of claim 4, further comprising an ionomer isolation layer between the at least one electrode and the protective layer, where the electrode and the underlayer are connected at discrete locations throughout the layer.

57. The assembly of claim 56, wherein the at least one electrode, the isolation layer and the protective layer define, in combination, a composite electrode structure.

58. The assembly of claim 4, wherein the at least one electrode is the cathode.

59. The assembly of claim 4, wherein the protective layer has a thickness, and wherein the catalyst includes large particles having a particle size which is between 60 and 90% of the thickness of the protective layer.

60. The assembly of claim 4, wherein the protective layer has a thickness, and wherein the catalyst includes large particles having a particle size which is between 65 and 75% of the thickness of the protective layer.

61. The assembly of claim 59, wherein the large particles constitute less than 20% of a total weight of the catalyst in the protective layer.

62. The assembly of claim 59, wherein the large particles constitute between 5 and 20% of a total weight of the catalyst in the protective layer.

63. The assembly of claim 59, wherein the large particles constitute between 7 and 12% of a total weight of the catalyst in the protective layer.

* * * * *